United States Patent [19]

Burgener

[11] 3,740,652

[45] June 19, 1973

[54] SIGNAL SELECTOR CIRCUIT
[75] Inventor: Willis R. Burgener, St. Louis, Mo.
[73] Assignee: Monsanto Company, St. Louis, Mo.
[22] Filed: Nov. 17, 1971
[21] Appl. No.: 199,688

[52] U.S. Cl............ 328/137, 307/218, 307/235 R, 328/92, 328/117, 328/154, 328/175
[51] Int. Cl....................... H03k 17/74, H03k 19/30
[58] Field of Search .................. 307/204, 218, 219, 307/235 R, 235 A, 242, 243, 237; 328/71, 92, 104, 115, 116, 117, 137, 146, 147, 150, 154, 175, 171

[56] References Cited
UNITED STATES PATENTS

| | | | |
|---|---|---|---|
| 3,461,315 | 8/1969 | Nathan | 328/115 X |
| 3,284,716 | 11/1966 | Chopin | 307/235 X |
| 3,619,791 | 11/1971 | Moreines | 328/137 X |
| 3,031,142 | 4/1962 | Cohen et al. | 328/137 X |
| 3,557,383 | 1/1971 | Wavre | 307/235 X |
| 2,476,066 | 7/1949 | Rochester | 307/218 X |
| 2,783,453 | 2/1957 | Rose | 328/146 X |
| 3,305,735 | 2/1967 | Moreines | 307/204 |
| 3,358,157 | 12/1967 | Shearme | 307/235 |

Primary Examiner—John W. Huckert
Assistant Examiner—L. N. Anagnos
Attorney—N. E. Willis, W. I. Andress and H. R. Patton

[57] ABSTRACT

Described herein is an analog signal selector circuit including an input circuit comprising two arrays of semiconductor diodes, all having substantially identical forward-bias characteristics, and an input circuit comprising a noninverting operational amplifier having a feedback loop, in which is operatively connected a forward-biased semi-conductor diode having characteristics matched to those of the two diode arrays. The arrays are connected to input terminals to which discrete analog input signals (DC) are applied. Selective actuation of the diode arrays results in the highest or lowest of the input signals being selected and applied to the operational amplifier, the output of which precisely reproduces the selected input signal, notwithstanding variations in the electrical characteristics of the array diodes as a result of temperature changes.

3 Claims, 2 Drawing Figures

PATENTED JUN 19 1973

3,740,652

INVENTOR
WILLIS R. BURGENER

BY *Harold R. Callow*
ATTORNEY

SIGNAL SELECTOR CIRCUIT

FIELD OF THE INVENTION

The present invention relates generally to signal selector circuitry, and more particularly to an analog signal selector circuit which accurately produces at its output terminal either the highest or lowest signal of a plurality of signals applied to its input terminals.

BACKGROUND OF THE INVENTION

In the field dealing with process control by means of electronic or like controllers (for example, industrial chemical process plants), it is sometimes desirable to monitor a plurality of secondary variables, in addition to the primary variable, of a given process and switch the control function from the controller associated with the primary variable to a controller associated with a secondary variable, when the secondary variable exceeds or falls below a predetermined level or as it is commonly referred to — a preset limit. This type of control is often employed where the secondary variables are concerned with safety or economic control considerations. To effect such control requires a signal selector circuit which is capable of selecting a secondary controller output when it surpasses its preset limit (high or low). The selected signal then becomes the control signal and, as well, may be fed back to the override controllers not on control to limit reset windup and minimize system overshoot.

Heretofore, such signal selector circuits have not proved entirely satisfactory under all conditions of service for the reasons that the accuracy (deviation of output signal from the selected signal) sometimes varies considerably with ambient temperature changes and provision is not normally made for easily selecting either a high or low control signal.

SUMMARY OF THE INVENTION

The general purpose of this invention is to provide an analog signal selector circuit which embraces all of the advantages of similarly employed signal selector circuits, yet does not possess the aforedescribed disadvantages. To attain this, the present invention utilizes a unique combination of a semiconductor diode array selector circuit together with an operational amplifier circuit having a feedback loop matched to compensate for any attenuation of a selected input signal caused by the input circuit, as well as signal deviations which might otherwise occur because of temperature variations, or the like.

An object of the present invention is the provision of a signal selector circuit which is substantially insensitive to temperature variations.

Another object of the present invention is the provision of an analog signal selector circuit comprised of solid-state components and which may be employed in a compact instrument design for high density mounting.

A further object of the present invention is the provision of an analog signal selector circuit for readily selecting either the high or the low of a plurality of DC input signals.

Still another object of the present invention is the provision of analog signal selector circuitry for selecting high or low signals from a plurality of signals and accurately reproducing such signals for further utilization as control signals, or the like.

In the present invention these purposes (as well as others apparent herein) are achieved generally by providing a circuit having a plurality of input terminals adapted to receive discrete analog input signals. Matched semiconductor diodes are coupled to the input terminals and forward biased, thereby to select either the high or low input signal by providing a low impedance input circuit path therefor; all diodes but that comprising the low impedance path are rendered reverse-biased. The input circuit is coupled to an operational amplifier output circuit including a feedback circuit having an impedance corresponding to that of the low impedance path of the input circuit, especially for temperature variations. In this manner, the selected input signal (high or low) is accurately reproduced and suitable for effecting various precise control functions.

BRIEF DESCRIPTION OF THE DRAWINGS

Utilization of the invention will become apparent to those skilled in the art from the disclosures made in the following description of a preferred embodiment, as illustrated in the accompanying drawings, in which.

DESCRIPTION OF THE PREFERRED EMBODIMENT

I. INPUT CIRCUIT

Figure 1:
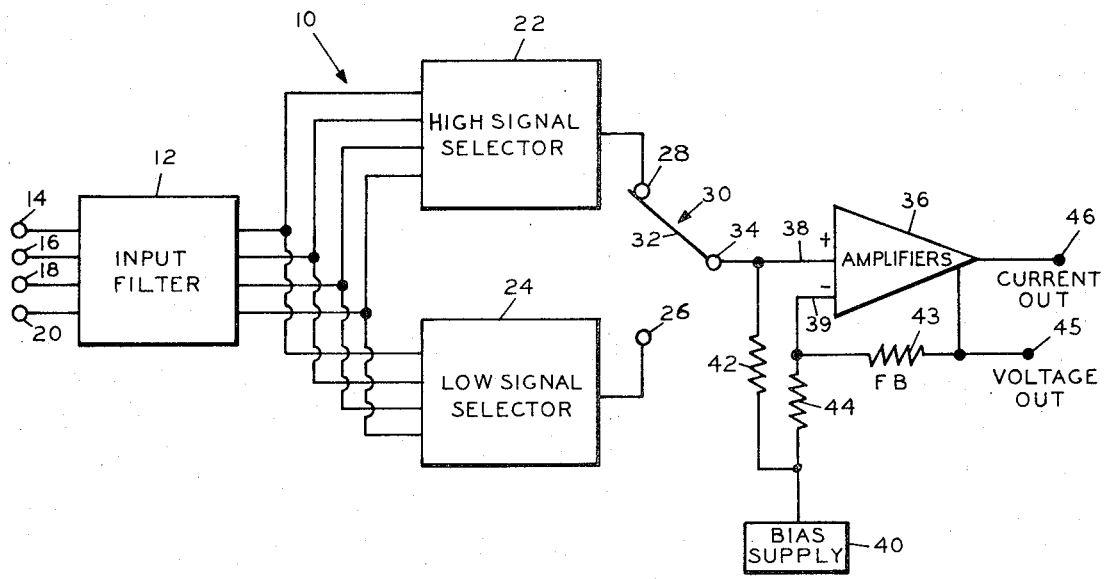
FIG. 1 is a block diagram drawing of a signal selector circuit in accordance with the invention.

Referring now to the drawings, wherein like reference numerals designate like or corresponding parts throughout the several views, there is shown in FIG. 1 a signal selector circuit, generally designated 10. The input circuit of the signal selector circuit 10 comprises an input filter network 12, four input terminals 14, 16, 18 and 20, a high signal selector circuit 22, and a low signal selector circuit 24. The input filter network 12 is coupled between the input terminals 14, 16, 18, 20 and the high and low signal selector circuits 22 and 24, respectively, to remove or suppress noise and spurious signals from the analog input signals. Typically, for many industrial control applications, the input signals may be in the range of from 1 to 5 volts DC.

The filtered input signals are applied to the selector circuits 22 and 24, the output terminals 26 and 28 of which serve as switch contacts for a high-low selector switch, generally designated 30, and having a contact arm 32. As will be more fully described hereinafter, the analog signal (of those applied to the input terminals) having the highest signal level appears at output terminal 28, while the analog signal having the lowest signal level appears at output terminal 26. Thus, the position of the contact arm 32 of the high-low selector switch 30 determines whether the high or low signal is selected and applied to the input terminal 34 of the output circuit, now to be described, of the signal selector circuit 10.

II. THE OUTPUT CIRCUIT

The output circuit of the signal selector circuit 10 comprises a high-gain, DC operational amplifier 36, preferably of the integrated circuit type. Its noninverting (positive) input terminal 38 is connected to the switch contact arm 32 at the input terminal 34, and to a source 40 of biasing potential by means of a resistor 42, which resistor serves to determine the current to the signal selector circuits 22 and 24. Its inverting (negative) input terminal 39 is connected to the biasing potential source 40 by a resistor 44, chosen to have a resistance value equal to that of the resistor 42, and to the voltage output terminal 45 of the signal selector circuit 10 by means of a feedback impedance or resistor 43. For purposes to be more fully explained hereinafter, the feedback impedance 43 is chosen to be substantially equal to the series impedance of any conductive path between the input terminals 14, 16, 18 or 20 and the input terminal 38 of the amplifier 36.

As may be seen, a current output terminal 46 is also provided.

OPERATION OF SELECTOR CIRCUIT 10 OF FIG. 1

Figure 2:
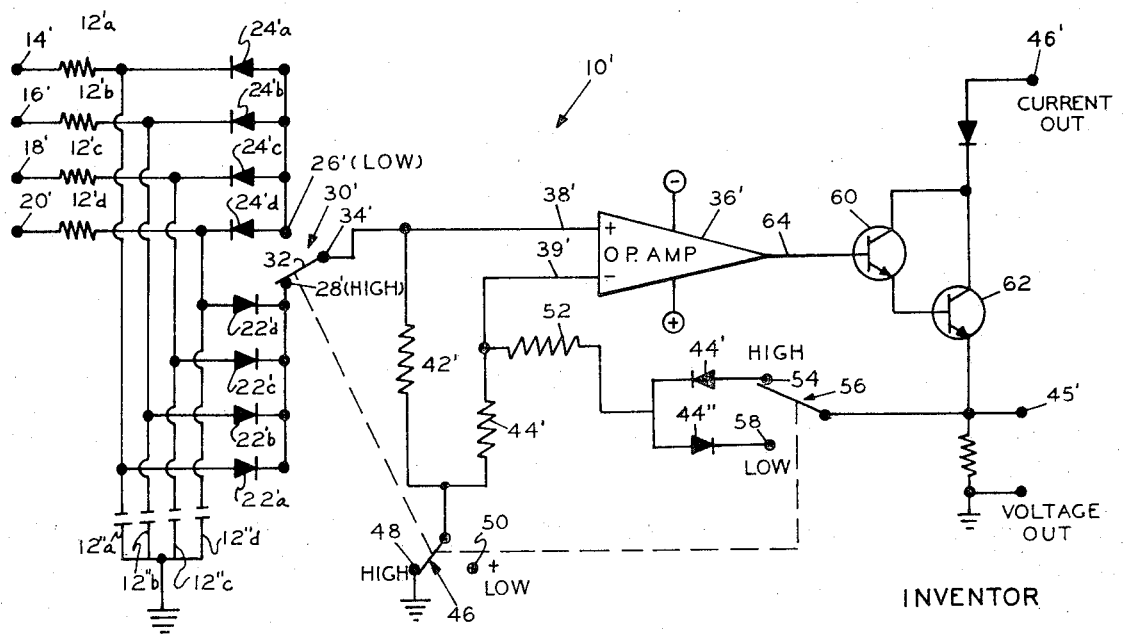
FIG. 2 is a simplified schematic diagram of the signal selector circuit of FIG. 1, wherein diode array selector circuits are employed.

Assume that input signals of 2, 3, 4 and 5 volts DC are applied to the input terminals 14, 16, 18 and 20, respectively, of the signal selector circuit 10, and that the high-low selector switch 30 is in the position shown in FIG. 1, so as to select the high level input signal. Thus, the 5 volt DC signal at input terminal 20 is applied to the input terminal 38 of the amplifier 36 by a low impedance path and the 2, 3 and 4 volt signals are blocked by a high impedance path. In actual practice, the 5 volt signal is reduced by the voltage drops across the input filter and high signal selector circuit 22. Consequently, the resulting control signal would not accurately correspond to the value of the selected input signal unless corrective compensation is made. Since the feedback impedance or resistor 43 is chosen to equal the impedance or resistance contributing to these voltage drops in the low impedance path of the input circuit, they are accurately compensated. That is, the current in the feedback circuit is forced to be equal to the input current between the input terminal 20 and the biasing supply source 40 by using the resistor 44, corresponding in value to the resistor 42, and a feedback impedance 43 corresponding to that of the input signal path. Consequently, the signal at the output terminal 43 is equal to the selected input voltage of 5 volts DC in accordance with the well known operational amplifier relationships:

1. $e_o = e_{in} \, Z_{fb}/Z_{in}$
2. $Z_{fb} = Z_{in}$
3. Substituting (2) in (1) $e_o = e_{in} = 5$ volts DC where $e_o$ = amplifier output voltage
$e_{in}$ = input voltage
$Z_{fb}$ = feedback impedance
$Z_{in}$ = input impedance Referring now to FIG. 2, a more detailed input and operational-amplifier feedback circuit for the signal selector circuit is shown. It should be understood that the signal selector circuit 10' of FIG. 2 is identical to that of FIG. 1 insofar as its overall operation is concerned. However, certain components and switches are added to provide an embodiment suitable for readily switching from the "high select" mode of operation to the "low select" mode.

As may be seen in FIG. 2, the input filter network 12' of the circuit 10' of FIG. 2 is comprised of resistors 12'a, 12'b, 12'c, and 12'd, all of equal value, connected to the input terminals 14', 16', 18' and 20' respectively and coupled to ground potential by filter capacitors 12''a, 12''b, 12''c and 12''d, respectively, The high signal selector circuit 22' is comprised of an array or set of four conventional semiconductor diodes 22'a, 22'b, 22'c and 22'd having their anodes connected to one terminal of the resistors 12'a, 12'b, 12'c and 12'd, respectively, and their cathodes connected to the "high" contact terminal 28' of the selector switch 30'. The low signal selector circuit 24' is comprised of another array or set of four semiconductor diodes 24'a, 24'b, 24'c and 24'd poled in the opposite direction of that of the diodes 22'a–22'd; that is with their cathodes connected to the resistors 12'a, 12'b, 12'c and 12'd, respectively, and their anodes connected to the "low" contact terminal 26' of the selector switch 30'. Preferably, all of the diodes 22'a–22'd, 24'a–24'd, 44', and 44'' are of a monolithic array type construction, so that they have substantially matched or identical electrical and thermal characteristics.

The output circuit of the signal selector circuit 10' includes the operational amplifier 36' having its noninverting input terminal 38' coupled to the input terminal 34' and to a biasing potential switch 46 by means of a resistor 42'. The switch 46 may be actuated to contact a "high signal" contact 48 or a "low signal" contact 50 to provide appropriate forward bias for the diode array 22'a–22'd or the diode array 24'a–24'd. In addition, there is provided in the feedback circuit or loop of the output circuit a series resistor 52, which couples the inverting input terminal 39' of the operational amplifier 36' to the cathode and anode of the matched diodes 44' and 44'', respectively. For reasons that will become more apparent hereinafter, the value of resistor 52 is chosen to be equal to that of each of the resistors 12'a–12'd. The anode of the diode 44' is connected to the "high signal" contact 54 of a feedback path switch 56, while the cathode of the diode 44'' is connected to a "low signal" contact 58 associated with the switch 56.

A conventional Darlington circuit configuration, comprising transistors 60 and 62, is provided between the output terminal 64 of the amplifier 36' and the voltage output terminals of the signal selector circuit 10' to serve as a current driver circuit for the current output terminal 46'.

OPERATION OF CIRCUIT 10' OF FIG. 2

With the ganged switches 30', 46 and 56 in the "high signal" select mode of operation as shown in FIG. 2, the five diodes 22'a–22'd and 44' of the matched, monolithic array are rendered operational in the circuit 10'. Since the cathodes of the diodes 22'a–22'd are connected to ground in this mode of operation, the highest analog input signal (+1–5 volts DC) appearing at one of the input terminals 14', 16', 18' or 20' will forward bias its associated diode. This action will cause the other diodes of this particular "high signal" array or set to become reverse biased. Thus, the high level signal is selected and applied by means of a low impedance signal path comprising a resistor 12' and a forward-biased diode 22' to the operational amplifier 36'. As explained hereinabove, this signal is reduced by the voltage drops associated with one of the filter resistors (12'a–12'd) and the forward-biased diode in series with it. Remembering that the diode 44' has electrical characterstics matched to each of the diodes 22'a–22'd and that the resistor 52 is equal in value to each of the resistors 12'a–12'd, then again we have the desired situation of the input and feedback impedances of the operational amplifier 36' being equal. Consequently, the high level input signal selected at the input terminal will be accurately reproduced at the voltage output terminal 45'. I have found that over a wide temperature range and without the need for calibrating adjustments, an accuracy of ±0.5 percent is readily obtainable using commercially available circuit components in accordance with my invention.

It should be apparent that the lowest signal may be similarly selected and accurately reproduced at the output terminal 45' of the signal selector circuit 10' by actuating the gauged switches 30', 46 and 56 such that they engage the contacts 26', 50 and 58, respectively. The biasing potential applied to the contact 50 is selected to be greater than the highest anticipated input signal, so that under such conditions the lowest voltage signal will forward bias the diode associated with the input terminal to which it is applied and result in the remaining diodes becoming reverse biased. In this manner, the lowest signal applied to the input terminals is selected by the diode array comprising diodes 24'a–24'd, while matched diode 44'' serves to compensate for any voltage drop caused by the input filter and selector circuitry.

It should be apparent that the forward-biased matched diodes will react identically to temperature variations and offset or compensate any circuit changes which would otherwise contribute to errors in the output signals. Although emphasis herein has been placed on the technique of matching the circuit input impedance with the feedback impedance of the operational amplifier, it should be apparent that the voltage drops associated with the threshold voltages of the individual diodes of the selector circuits are properly compensated by a matched diode threshold voltage drop in the feedback circuit of the amplifier.

Obviously, many modifications and variations are possible in view of the above teachings. Therefore, it is to be understood, that the invention may be practiced otherwise than as specifically described.

I claim:

1. A combination high or low signal selector circuit comprising,
   a plurality of input terminals each adapted to receive separate analog input signals,
   an output terminal,
   a first plurality of matched semiconductor diodes having their cathodes coupled together and each of their anodes coupled to a predetermined terminal of said plurality of input terminals,
   a second plurality of matched semiconductor diodes having their anodes coupled together and each of their cathodes coupled to a predetermined terminal of said plurality of said input terminals,
   operational amplifier means having first and second input terminals and an output terminal, the output of said amplifier means being coupled to said selector circuit output terminal, said amplifier means including feedback circuit means coupled between its said output terminal and its said second input terminal,
   first and second semiconductor diodes, said first diode being matched to those diodes of said first plurality of matched diodes and said second diode being matched to those diodes of said second plurality of matched diodes,
   first and second biasing potential sources for biasing said first and second plurality of matched diodes respectively, and
   switching means for selectively coupling said cathodes and anodes of said first and second plurality of matched diodes, respectively, to said first input terminal of said amplifier means, selectively coupling said biasing potential sources to said first and second plurality of matched diodes, and selectively including one of said first and second diodes in said feedback circuit of said amplifier means,
   whereby said switching means may be actuated and the high or low signal applied to said input terminals is selected and accurately reproduced at said output terminal of said selector circuit notwithstanding temperature variations, or the like, said first and second diodes compensating for both threshold voltage drops and impedances of said first and second plurality of matched diodes.

2. An analog signal selector circuit, comprising,
   a plurality of input terminals adapted to receive discrete analog input signals,
   selector circuit means electrically coupled to said input terminals for establishing a low impedance path for one of said input signals and high impedance paths for all other input signals, said selector circuit means comprising two sets of semiconductor diode arrays, one set being poled to select a high input signal and the other poled to select a low input signal, means providing respective operative-biasing potentials for each of said diode arrays, and switching means for selectively actuating one of said diode arrays and its corresponding biasing potential means,
   high-gain, DC amplifier means having its input electrically coupled to either of said sets of diode arrays by said switching means, said amplifier means including an output and a feedback circuit between its input and output having an impedance corresponding to that of said low impedance path of said selector circuit means, said feedback circuit impedance selectively comprising at least one of a plurality of forward-biased semiconductor diodes matched to those diodes of said arrays, and
   whereby the input signal applied to said low impedance path of said selector circuit means is accurately reproduced at said output of said amplifier means.

3. The analog signal selector circuit as defined in claim 2, wherein
   all of said semiconductor diodes are matched to have substantially identical electrical and thermal characteristics.

* * * * *